United States Patent Office 3,468,823
Patented Sept. 23, 1969

3,468,823
MALEIC INTERPOLYMER-STARCH-ROSIN SIZES
Paul R. Graham and August F. Ottinger, St. Louis, Mo., assignors to Monsanto Company, St. Louis, Mo., a corporation of Delaware
No Drawing. Filed June 14, 1965, Ser. No. 463,891
Int. Cl. C08b 25/02
U.S. Cl. 260—17.4                                  8 Claims

ABSTRACT OF THE DISCLOSURE

This invention relates to a composition comprising a rosin size of an alkanoic acid and an interpolymer of a $\alpha,\beta$ unsaturated polycarboxylic acid and a monocyclic aromatic hydrocarbon alpha-olefin, starch modified with said composition and paper coated with the modified starch composition.

---

This invention relates to polymer modified rosin size compositions. More particularly this invention provides rosin size compositions containing interpolymers of maleic anhydride, maleic acid and related alpha,beta-unsaturated polybasic carboxylic acids or anhydrides. These compositions have been found to be particularly useful as starch modifiers for the surface sizing of cellulosic webs.

An object of this invention is to provide compositions which are particularly useful for modifying starch compositions used in the surface sizing of cellulosic webs.

A more particular object is to provide maleic interpolymer modified rosin size compositions which are particularly suited for use in starch dispersions for the surface sizing of paper.

Another object is to provide cellulosic webs which are surface sized with aqueous dispersions containing a major proportion of starch and minor amounts of a rosin size and a salt of a maleic anhydride interpolymer.

Another object of this invention is to provide a method which provides for more efficient and more economical surface sizing of cellulosic webs.

These and other objects are accomplished and provided for by our discovery that the combination of salts of interpolymers of the anhydrides of alpha,beta-unsaturated polybasic carboxylic acids such as maleic anhydride and alpha-olefins, alkyl vinyl ethers, or vinyl alkanoates with rosin sizes or with alkali metal salts of long chain alkanoic acids produces an unexpected high degree of water resistance on paper or paperboard treated with the combination. Moreover, considerable economic advantage results from using this mixture which is synergistic in its results in many cases when used either alone or in combination with a major proportion of paper sizing grades of starch, starch products, or proteinaceous paper coating materials.

We have found that mixtures of the maleic-type interpolymer resin salts and the rosin sizes give webs surface-treated therewith ink and lactic acid penetration resistances which are higher in seconds of holdout, than resistances obtained by treating webs with equivalent amounts of the maleic-type interpolymer resin or rosin size alone. The results with these combinations carry over to their use in mixture with major proportions of papermaker's starch, where substantial economies to the papermaker can be realized. These results are surprising because one would expect that the resistance of the paper treated with the combination of ingredients as in this invention would be substantially lower than that of the maleic-interpolymer resin treated paper, but higher than that of the rosin size treated paper, for the same level or weight of applied material. We have observed, however, in most cases substantial increases in water, ink, and lactic acid hold-out or resistance times without material sacrifice to other paper properties such as oil resistance, tensile, brightness, at lower chemical cost.

The rosin size and maleic-type of interpolymer salt resin combination may be used in proportions by weight ranging from about 1:10 to about 10:1 of rosin size to maleic-type of interpolymer. Preferred ranges are 25:75 to 75:25 percent by weight. Optimum performance results are usually observed when the proportions are about 50:50 of rosin size to maleic-type to interpolymer resin salt. However, economics may dictate that more rosin size relative to the maleic-type interpolymer resin salt be used. Thus by use of this combination the effectiveness and value of the rosin size as a surface size can be substantially enhanced by incorporating therein a small but effective amount of the usually more expensive maleic-type interpolymer resin.

The rosin size component which is mixed with the maleic-type interpolymer resin salt may be any of the well known gum, wood, or tall oil rosin sizes obtained by saponifying the gum, wood or tall oil rosin to substantial neutrality with an alkaline material. Usually, bases used for this purpose are sodium hydroxide, sodium carbonate, potassium hydroxide, etc. The rosin is usually neutralized to an acid number of less than about 30. The rosin size may be a liquid, paste, or dry rosin size. Dry rosin sizes which are substantially completely neutralized, that is, those which have acid numbers below about 1, are preferred. The rosin size component may be a modified or fortified rosin size. Modified or fortified rosin sizes are made by reacting or mixing with the rosin varying amounts of maleic anhydride, fumaric acid, and/or formaldehyde with the rosin, sometimes in the presence of an acid catalyst such as p-toluenesulfonic acid. When used, the amounts of maleic anhydride or acid usually ranges from about 1 to 10 pounds of maleic anhydride per 100 lbs. of rosin. Fumaric acid is used in amounts ranging from about 1 to 10 pounds per 100 pounds of rosin, either in the presence of or in the absence of maleic anhydride. Formaldehyde is often used in amounts ranging from 1 to about 25 pounds per 100 pounds of rosin. To prevent stratification it is common to include a small amount of sodium or potassium chloride, say from about 0.25 to 3.0 pounds of salt per 100 pounds of rosin. Dry rosin sizes containing alkane hydrocarbon oil coatings to prevent dusting may also be used. Examples of useful rosin sizes which may be used include those described in U.S. Patents 2,134,912; 2,265,941; 2,846,328; 2,873,203; 2,934,468; 2,985,537 and 2,994,635.

In place of the rosin size there may be used equivalent weight amounts of alkali metal salts of long chain fatty acids such as those having from 12 to about 30 alkyl carbon atoms, such as the sodium, potassium salts of dodecanoic, tetradecanoic, hexadecanoic, octadecanoic, eicosanoic, tricontanoic acids. Mixtures of salts of these long chain alkanoic acids may also be used. Quaternary ammonium salts of these acids may also be used but are not preferred for reasons of cost.

The terminology "maleic-type" interpolymer resin salt used hereinabove refers to the component (2) of the composition and refer to the salt of the interpolymers of an alpha,beta-olefinically unsaturated polycarboxylic acids, that is, polybasic carboxylic acids or anhydrides thereof, having from 4 to about 6 carbon atoms with alpha-olefins, alkyl vinyl ethers, or vinyl alkanoates. Because of cost and availability maleic anhydride is preferred for preparing these copolymers although free maleic acid, fumaric acid, and other homologous or related di and tricarboxylic acids such as itaconic acid, aconitic, citraconic acids or anhydrides thereof can also be used, if desired, to react with the alpha-olefin, alkyl vinyl ether, or vinyl alkanoate monomer.

The alpha-olefins used to prepare these "maleic-type" interpolymers may be aliphatic alkene alpha-olefinically unsaturated hydrocarbons having from 2 to about 40 carbon atoms such as ethylene, propylene, butylene and higher alpha-olefin hydrocarbons which may be branched or straight chained, e.g. 3-methyl-1-pentene, 4-methyl-1-pentene, 1-hexene, isoctene, 1-dodecene, 1-hexadecene, 1-octadecene, 1-docosene, 1-tricontene, etc. Preferably, however, the alpha-olefin is a monocyclic aromatic hydrocarbon alpha-olefin such as styrene, vinyltoluene, vinylxylene, chlorinated styrenes, etc. Mixtures of alpha-olefins may be used if desired.

Alkyl vinyl ether may also be used as a comonomer with maleic anhydride or one or more of its equivalents to prepare useful interpolymers for use in this invention. They may be prepared in conventional manner by treatment of an alcohol with an alkali catalyst followed by reaction with acetylene. The alcohols used can be straight or branched chained, naturally occurring or synthetic, e.g., those resulting from the "oxo" and other processes. These vinyl ethers are of the general formula $$Z-O-CH=CH_2$$

wherein Z is an alkyl group containing from 2 to about 40 carbon atoms, and preferably from about 10 to about 32 carbon atoms. Representative vinyl ethers include, for example, oxo-decyl, oxo-tridecyl, oxo-hexadecyl, oxo-nonadecyl, propyl, hexyl, n-decyl, n-dodecyl, n-octadecyl, n-tetracosyl, n-tritriacontyl, tetratriacontyl, hexatriacontyl vinyl ether. Aryl vinyl ethers, alkoxyalkyl vinyl ethers, aryloxyalkyl vinyl ethers, and alkylaryl vinyl ethers and the like such as phenyl, benzyl, tolyl, dodecylphenyl octadecylphenyl, xylyl, dinonylphenyl, methoxyphenyl, ethoxyphenyl, dodecyloxyphenyl, octadecyloxyphenyl, phenoxyphenyl, phenoxyhexyl, phenoxyoctyl, phenoxyoctadecyl vinyl ethers could also be used to react with the maleic-type of alpha,beta-unsaturated polycarboxylic acid or anhydride to form the interpolymers used in this invention. Mixtures of alkyl vinyl ethers obtained from mixed alcohols of the type described above may also be used.

The vinyl alkanoate esters which are used as comonomers with maleic anhydride or related compounds include those having up to about 8 carbon atoms in the alkanoate moiety. Vinyl acetate, vinyl propionate, vinyl butanoate, vinyl pentanoate, vinyl hexanoate, vinyl heptanoate, and vinyl octanoate may be used. Vinyl acetate is preferred. Related compounds having the polymerizable double bond in the acid moiety of the ester such as methyl methacrylate, methyl acrylate, ethyl acrylate may also be used.

The salt of the interpolymer resin may be derived from any basic material which helps to dissolve or disperse the resin in aqueous media. Generally alkali metal bases such as sodium hydroxide, potassium hydroxide, or basic salts of these bases, as well as ammonia, ammonium hydroxide, or tertiary alkyl quaternary ammonium hydroxides, included herein as "ammonium" bases are used to form the salts of the interpolymer resin component of the compositions.

The interpolymers are preferably copolymers of maleic anhydride with one other type of monomer, that is, an alpha-olefin, an alkyl vinyl ether, or a vinyl alkanoate. However, third comonomers of the same or from one of the other mentioned types could also be used to prepare three or more component interpolymers. It is preferred that the maleic anhydride be used in the molar range of from 0.9 to 1.1 moles of it to 1 mole of the alpha-olefin, alkyl vinyl ether, or vinyl alkanoate comonomer. The interpolymers may be used as low molecular polymers of low viscosity or have higher molecular weight materials ranging from about 1,000 to about 200,000. It is preferred to use interpolymers having specific viscosities in the range of from about 0.2 to 3.0.

An example of a suitable oxo-tridecyl vinyl ether/maleic anhydride copolymer which can be used is one prepared as follows:

Oxo-tridecyl vinyl ether (226.4 g., 1.00 mole) in 500 g. of xylene was heated slowly to 70°, stirred, and nitrogen-purged (air was removed) and then 5 ml. of a 10 ml. solution of 0.34 g. (0.25% on maleic anhydride) of azobis-iso-butyronitrile (initiator) in benzene was added at once at 72° C. and maleic anhydride (103 g; 1.05 moles) was added proportionately with the remaining solution of initiator over 2 hours at 71°–72° C. The mixture was stirred for an additional 2.5 hours at 73–74° C. at the end of which time no unreacted maleic anhydride and only a trace of the tridecyl vinyl ether was noted by infrared analysis. The specific viscosity of a sample of the copolymer was 1.50 (fourfold the time ratio for drainage of a 1% solution of polymer in methyl ethyl ketone in a capillary viscometer).

A mixed olefin/maleic anhydride copolymer was prepared as follows:

To a 22 liter flask equipped with stirrer, themometer, reflux condenser, nitrogen inlet tube, and addition funnel there was added 4,500 g. (20.0 moles) of a commercially available $C_{14}$–$C_{18}$ mixed aliphatic alkene alpha-olefin, and about one-half of 5309 g. (50.0 moles) of mixed xylenes. The flask was purged with nitrogen while the mixture was heated to about 140° C. over about 1 hour. Then about one-half of 131.6 g. (0.9 mole) of di-tert-butyl peroxide was added to the flask and addition of a solution of maleic anhydride and the other half of the di-tert-butyl peroxide dissolved in the other half of the xylene was added from the addition funnel over about 60 minutes while controlling the temperature at from 140° C. to about 145° C. Tert-butanol distillation was noted after about 45 minutes of addition. The mixture was held at 136°–140° for 2 hours and then xylene was stripped out of the reaction mixture over a 133 minute period at temperatures of from 138° C. up to about 170° C. The pressure was dropped to a final pressure of 40 mm. as the temperature increased. Total distillate including tert-butanol was 5530 g. The viscous yellow resin polymer which remained as residue weighed 7015 g. was poured into storage containers. Upon cooling it solidified to a yellow-colored brittleg lass. It was pulverized sufficiently to pass through a 20 mesh screen. The copolymer had a specific viscosity of 0.24 as measured on a 4% solution in methylethylketone at 25° C. The average molecular weight was 2095.

The liquid product obtained from these reactants before cooling had a density of about 0.77 g./ml. (6.4 lbs./gal.) at 170° C. It had a melting point of about 110° C. Approximate viscosities of the resin product at various temperatures are:

| Temperature (° C.): | Viscosity (stokes) |
|---|---|
| 150 | 170 |
| 160 | 117 |
| 170 | 79 |
| 180 | 43 |

A solution was prepared as follows:

Weigh 10.0 g. of the polymer into a 125-ml. beaker. Add about 40–45 g. of distilled water. Start agitator, and add immediately ammonia solution equivalent to the polymer (0.535 ml. of 28% aqueous ammonia per gram of polymer). Stir 10 minutes at room temperature; heat to 60°–70° C. and hold at this temperature for another 20 minutes. After solution has been effected make certain it is basic to phenol-phthalein paper by adding ammonia solution as necessary. Add enough water to give a total weight of solution of 66.7 g. (15% polymer).

At 25° C. this ammoniacal copolymer solution had viscosity of 4.0–5.0 centipoises. As measured with a "Brookfield" model LVT viscometer equipped with a UL adapter.

In the examples herein the styrene-maleic anhydride copolymer employed was prepared in the following manner:

Substantially equimolecular proportions of styrene and maleic anhydride were heated for substantially four hours in xylene at 100° C. under a slight pressure in the presence of 0.25% benzoyl peroxide catalyst based on the combined weight of the two monomers. The weight ratio of styrene plus maleic anhydride to solvent was 10% so that after the reaction an approximate 10% slurry of styrene-maleic anhydride copolymer was obtained. After the reaction was complete, the slurry was filtered and the filter cake dried in a vacuum drier.

About 90 parts of substantially dry styrene-maleic anhydride copolymer was stirred vigorously in a suitable reaction vessel while gaseous ammonia was added thereto. The copolymer contained substantially equal portions of styrene and maleic anhydride, and had a specific viscosity of about 0.29 in methyl ethyl ketone. The copolymer reacts exothermically with the ammonia. Thus, the temperature of the reaction mixture is a function of the rate of ammonia addition. In this example, the ammonia was added at a rate such that the maximum reaction temperature was approximately 65° C. At the completion of the reaction, the take up of ammonia ceases. This usually requires approximately 10% in excess of the theoretical 2 moles of ammonia per mole of anhydride. In the instant case about 17 parts of ammonia were used in the reaction. The resulting product, substantially devoid of carboxyl groups, was a white, free-flowing powder readily soluble in water and having an ammoniacal odor.

For some applications, it may be desirable to blend the maleic-type copolymer used with various modifiers which modify the properties of the resin in practical application. Materials such as polyvinyl alcohols which enhance, promote and extend the film forming properties of the resin are sometimes added. Such additive materials may constitute up to about 40 or 50% of the maleic-type copolymer resin composition.

The following examples illustrate the surprising increase in both lactic acid and ink solution sizing effectiveness obtained when a rosin size is included in modified starch surface sizes for cellulosic webs.

Example 1

(A) A standard commercially available hydroxyethylated corn starch having a fluidity of 80 ("Penford Gum 280") was applied by size press application at 25 pounds per square inch pressure to the surface of a standard water leaf paper made from unbleached sulfite pulp. This starch surface size coating was applied as an 8% total starch solids (40 gm. of dry starch in 460 gm. of water). The pH was 6.5 and the viscosity of the mixture at 65° C. was 8.5 cp. The starch treated sheet was determined to have picked up 5.5 lbs. of the starch mixture per 3000 square feet of paper surface. The ink and lactic acid resistances are given in the comparative table given below.

(B) Another sample of the same test paper was surface sized with a formulation containing 3.5 g. of a commercially available composition of the half methyl ester of a styrene-maleic copolymer resin mixed with about 30 percent by weight of said resin of polyvinyl alcohol (PVA), 459 gm. of water, 1.0 gm. of standard reagent grade NH$_4$OH, and 36.5 gm. of the same hydroxyethylated starch as described above. This formulation also contained 8% total solids, about a 1:10 ratio of the commercial resin:starch on a weight basis. It had a pH of 6.4 and a viscosity at 65° C. of 18.6 cp. When applied in the same manner as is described above there was dry size pickup of 7.3 lbs. per 3000 sq. ft. of paper surface. The comparative ink and lactic acid sizing data is also found in the table below.

(C) Another sample of the same test paper was surface sized with a formulation containing 3.5 g. of a commercially available, completely neutralized, dry rosin size, 460.0 g. of water, and 36.5 g. of the above described starch. The formulation had 8% total solids content, a 1:10 dry rosin size:starch weight ratio. The pH of the formulation was 8.4 and had a viscosity at 65° C. of 5.0 cp. The treated paper sheet showed a dry weight pickup of 5.1 lbs. of size formulation per 3000 sq. ft. The sizing results are summarized in the table below.

(D), (E), (F) Other samples of the same paper were in the same manner treated with formulations containing 10% by weight of various mixtures of the above half-methyl ester of styrene maleic acid copolymer-polyvinyl alcohol resin, the same dry neutralized rosin size based on the weight of dry starch in 459.7 gm. of water, and 36.5 g. of the same starch. These formulations also contained about 8.0% total solids and had 1:10 weight ratio of styrene-maleic-methyl half ester-PVA/dry rosin:starch. The styrene-maleic half-methyl ester to dry rosin size weight proportions was 25:75. The pH of the formulation was 8.2 and the viscosity at 65° C. was 8.4 cp. The treated paper showed a formulation pickup of 6.7 lbs./3000 sq. ft. The comparative sizing results are shown below.

In the ink penetration resistance test the test sheet is floated on a standard ink bath having a pH of 1.5 and observed for the appearance of an even ink coloration on the upper observed surface. The time is measured in seconds.

The lactic acid drop test is accomplished by laying on the test paper sheet drops of a 20% lactic acid aqueous solution from a B–D, Yale, 1 cc. Tuberculin No. 1YT syringe and noting the time, in seconds, required for the drops to penetrate the sheet. Both tests are conducted in an atmosphere of 70° F. and 50% relative humidity.

TABLE I

| Sizing agent | Water resistance ink penetration (sec.) | Lactic acid drop test (sec.) |
|---|---|---|
| A | 15 | 155 |
| B | 377 | 1,632 |
| C | 134 | 1,126 |
| D | 460 | 1,494 |
| E | 430 | 596 |
| F | 455 | 459 |

These results show the surprising finding that instead of proportionately reducing the sizing efficiency to somewhere between sizing effectiveness the SMA—CH$_3$—PVA resin modified starch and the rosin size-modified starch, the combined SMA—CH$_3$—PVA resin and rosin size-modified starch, in each formulation increased the sizing effectiveness over the results obtained with the

SMA—CH$_3$—PVA modified starch alone.

Example 2

Aqueous hydroxyethylated corn starch and the same aqueous starch formulation modified with either a commercially available water soluble sodium salt of styrene-maleic anhydride having a viscosity of about 60 cp. at 4% solids in water at 25° C., a commercially available, neutralized dry rosin size, or various mixtures of the resin and the rosin size to a 10% basis based on the weight of the starch were applied as surface sizes by a size press application to a waterleaf paper prepared from unbleached sulfite pulp and dried. The formulations applied were as follows:

| | Formulations (grams) | | | | | |
|---|---|---|---|---|---|---|
| | A | B | C | D | E | F |
| Resin | | 3.5 | | 2.7 | 1.8 | 0.9 |
| Rosin size | | | 3.5 | 0.9 | 1.8 | 2.7 |
| Water | 460 | 460 | 460 | 460 | 460 | 460 |
| Starch | 40 | 36.5 | 36.5 | 36.5 | 36.5 | 36.5 |
| Total solids, percent | 8.0 | 8.0 | 8.0 | 8.0 | 8.0 | 8.0 |
| Percent total modifiers on starch | 0 | 10.0 | 10.0 | 10.0 | 10.0 | 10.0 |
| Percent Resin in modifier | 0 | 100.0 | 0 | 75 | 50 | 25 |
| Percent Rosin in modifier | 0 | 0 | 100.0 | 25 | 50 | 50 |
| pH | 6.5 | 8.4 | 8.4 | 8.5 | 8.3 | 8.3 |
| Viscosity at 65° C., cp | 33.7 | 18.0 | 5.0 | 10.3 | 8.3 | 7.4 |
| Coating pickup, lb./3,000 ft.² | 5.5 | 7.4 | 5.1 | 7.7 | 6.8 | 6.0 |

The comparative ink penetration and lactic acid drop test resistances are given in the following table.

TABLE II

| Formulation | Resistance (sec.) | |
|---|---|---|
| | Ink | 20% lactic acid |
| A | 10 | 155 |
| B | 399 | 1,850 |
| C | 134 | 1,126 |
| D | 480 | 2,063 |
| E | 542 | 2,190 |
| F | 611 | 2,690 |

These results show that instead of reducing the sizing efficiency to a time period between that of the resin modified starch coated paper and that of the rosin size modified starch coated paper the combination of the resin and the rosin size at the same total weight percent of starch modification actually increases the degree of sizing.

EXAMPLE 3

Aqueous hydroxyethylated corn starch is modified with a mixture of equal parts by weight of an oxo-tridecyl vinyl ether/maleic anhydride copolymer resin solubilized in water with ammonium hydroxide, and paste rosin size which has been emulsified in water with sodium hydroxide, the amount of said copolymer resin salt rosin size mixture being 10% by weight of the weight of the dry starch in the aqueous mixture. Papers treated with this resulting mixture has substantially increased sized properties as is evidenced by increased resistance to standard ink and lactic acid test liquids.

What is claimed is:

1. A composition comprising a major proportion of starch modified with a minor proportion of (1) a member of the group consisting of a rosin size and a salt of a long chain alkanoic acid, and (2) a salt of an interpolymer of an alpha,beta-unsaturated polybasic carboxylic acid and a monocyclic aromatic hydrocarbon alpha-olefin selected from the group consisting of styrene, vinyltoluene, vinylxylene and chlorinated styrene, the proportions of component (1) to component (2) being from about 1:10 to about 10:1 in parts by weight, said salts being selected from the group consisting of alkali metal and ammonium.

2. A modified starch composition as described in claim 1 wherein component (1) is a rosin size and component (2) is a salt of an interpolymer of an alpha-beta-unsaturated polybasic carboxylic acid and styrene.

3. A modified starch composition as described in claim 2 wherein component (1) is a substantially completely neutralized, tall oil rosin size, and component (2) is an alkali metal salt of an interpolymer of maleic anhydride and styrene.

4. A modified starch composition as described in claim 2 wherein component (1) is a substantially completely neutralized, tall oil rosin size, and component (2) is an ammonium hydroxide neutralized interpolymer of maleic anhydride and styrene.

5. A cellulose web coated with an aqueous dispersion containing (A) starch, (B) a member of the group consisting of a rosin size and a salt of a long chain alkanoic acid, and (C) a salt of an interpolymer of an alpha-beta-unsaturated polybasic carboxylic acid and a monocyclic aromatic hydrocarbon alpha-olefin selected from the group consisting of styrene, vinyltoluene, vinylxylene and chlorinated styrene, said salts being selected from the group consisting of alkali metal and ammonium, the amounts of components (B) and (C) being minor with respect to the amount of starch in said aqueous dispersion, the proportions of component (B) to component (C) being from about 1:10 to about 10:1 in parts by weight, and dried to obtain a cellulose web having increased resistance to ink and lactic acid.

6. A cellulosic web coated as described in claim 5 wherein component (B) is a rosin size, component (C) is an alkaline salt of an interpolymer of an alpha-beta-unsaturated polycarboxylic acid and styrene.

7. A cellulosic web coated as described in claim 6 wherein component (B) is a substantially completely neutralized tall oil rosin size, and component (C) is a salt of an interpolymer of maleic anhydride and styrene.

8. A method which comprises incorporating into an aqueous dispersion of the starch used to coat a cellulosic web minor amounts, relative to the amounts of the starch used, of (1) a member of the group consisting of a rosin size and a salt of a long chain alkanoic acid, and (2) a salt of an interpolymer of an alpha,beta-unsaturated polybasic carboxylic acid and a monocyclic aromatic hydrocarbon alpha-olefin selected from the group consisting of styrene, vinyltoluene, vinylxylene and chlorinated styrene, the proportions of said component (1) to component (2) being from about 1:10 to about 10:1 in parts by weight, said salts being selected from the group consisting of alkali metal and ammonium.

References Cited

UNITED STATES PATENTS

| 3,368,987 | 2/1968 | Pollart et al. | 260—17.4 |
| 3,382,142 | 5/1968 | Hine et al. | 162—168 |
| 2,759,902 | 8/1956 | Claudi-Magnussen et al. | 260—27 |
| 2,971,934 | 2/1961 | Brown et al. | 260—27 |
| 3,127,362 | 3/1964 | Cohen et al. | 260—17.4 |
| 3,133,890 | 5/1964 | Britton | 260—17.4 |
| 3,259,596 | 7/1966 | Downer et al. | 260—17.4 |

WILLIAM H. SHORT, Primary Examiner

E. NIELSEN, Assistant Examiner

U.S. Cl. X.R.

117—155, 156, 161; 260—23